March 22, 1932.         W. P. OSGOOD                1,850,120
                    SEAM PRESSING MACHINE
            Original Filed Dec. 12, 1927    2 Sheets-Sheet 1
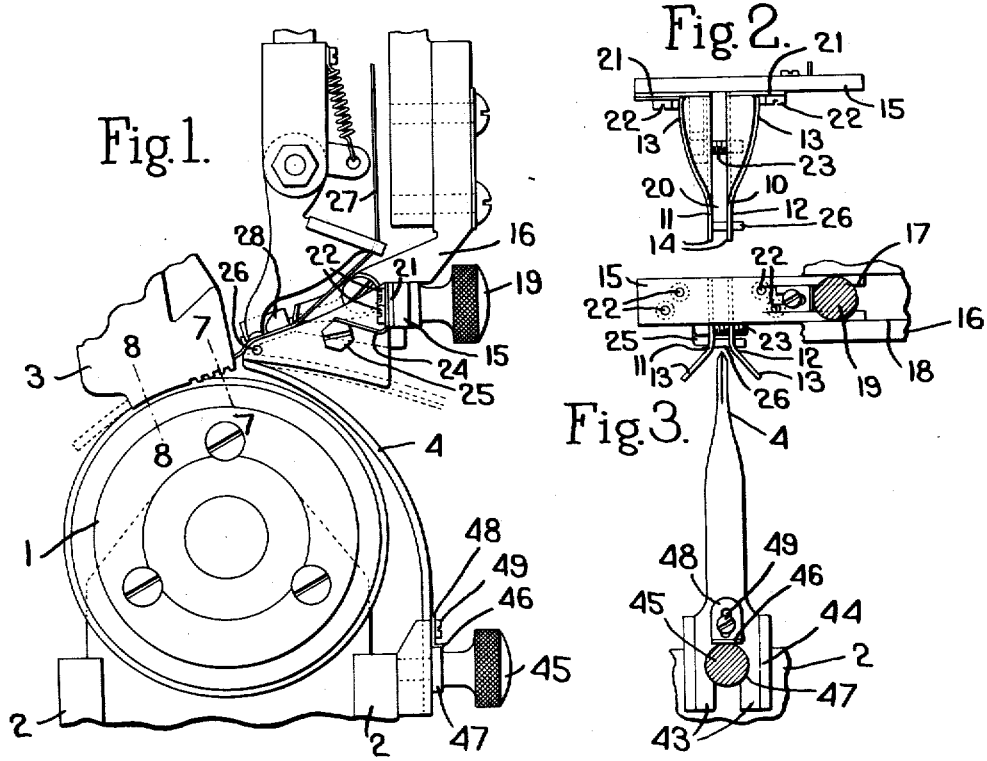
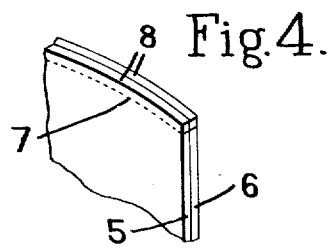
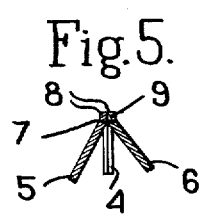
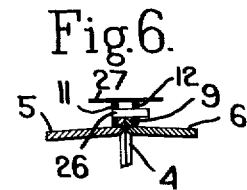
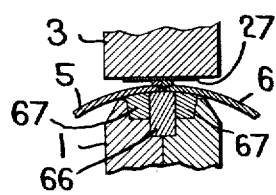
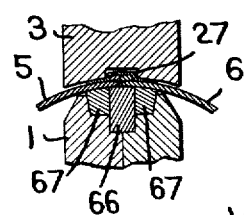
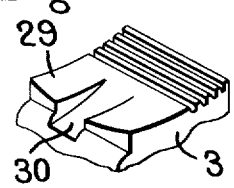
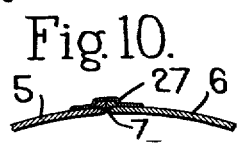
Inventor.
Walter P. Osgood
by Heard Smith & Tennant
                    Attys.

March 22, 1932. W. P. OSGOOD 1,850,120
SEAM PRESSING MACHINE
Original Filed Dec. 12, 1927  2 Sheets-Sheet 2
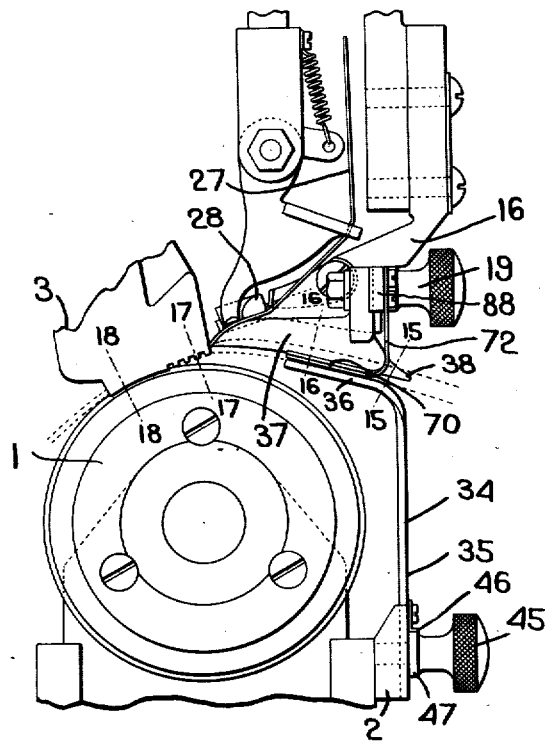
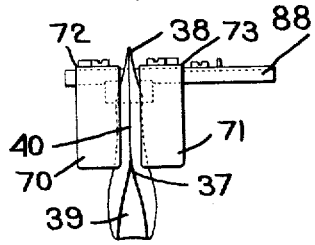
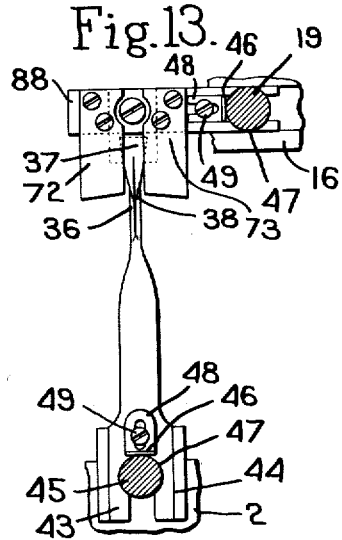
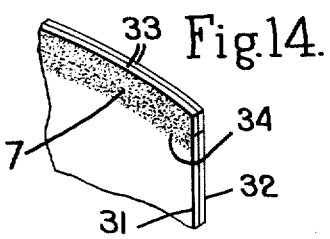
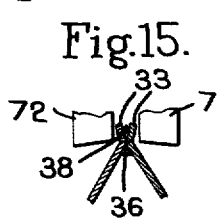
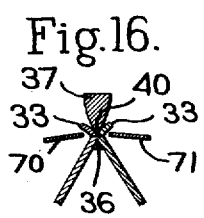
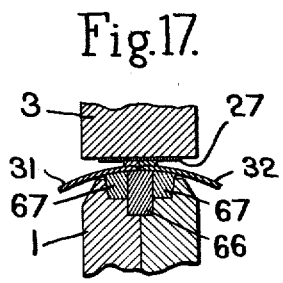
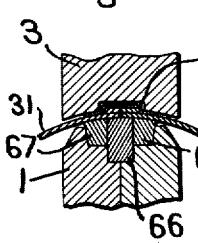
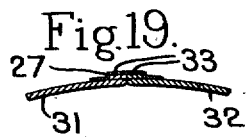
Inventor.
Walter P. Osgood
by Heard Smith & Tennant.
Attys.

Patented Mar. 22, 1932

1,850,120

UNITED STATES PATENT OFFICE

WALTER P. OSGOOD, OF MALDEN, MASSACHUSETTS, ASSIGNOR TO BOSTON MACHINE WORKS COMPANY, OF LYNN, MASSACHUSETTS, A CORPORATION OF MASSACHUSETTS

SEAM-PRESSING MACHINE

Application filed December 12, 1927, Serial No. 239,293. Renewed February 24, 1931.

This invention relates to seam-pressing machines of the general type shown in my Patent No. 1,646,212, dated October 18th, 1927. Said machine comprises a work support over which is fed work in the form of two pieces united by a seam, presenting a seam ridge on one face of the work and a seam crease on the other, together with means operating on the seam ridge to press or flatten it.

One of the objects of my present invention is to provide improvements relating to seam-pressing machines of this type by which the seam ridge will be accurately guided to the pressing member and by which a better pressing operation may be secured. In the attainment of this object I employ a yieldable seam crease supporting member which is situated in advance of the work support and which engages the seam crease on the opposite side of the work from the seam ridge as the work is fed to the work support, said seam crease support serving to assist in properly positioning the seam ridge for the pressing operation, and I also employ a novel seam ridge guiding member situated to act on the opposite side of the work from the seam crease support as the work is fed to the work support, said seam ridge-guiding member co-operating with the seam crease support in guiding the seam ridge and maintaining it in proper position to be acted on by the seam presser.

My improvements are applicable for pressing seams formed in either leather or fabric. In the case of two pieces of leather sewed together the seam allowance is considerably less than is necessary in the case of two-pieces of fabric sewed together. In other words, when two pieces of leather are sewed together face to face the seam may be placed much closer to the aligned edges of the two pieces than in the case of two pieces of fabric. Consequently, when two pieces of leather which have been seamed together are opened out into the same plane the seam ridge which is presented and which is formed by the edges of the leather extending beyond the seam is relatively shallow, while in the case of two pieces of fabric which are thus sewed together and afterwards opened out the seam ridge will stand up a greater distance from the fabric.

As applied to two pieces of leather which are seamed together my invention comprehends not only the yieldable seam crease support for supporting the seam as the work is fed to the work support but also comprehends a channel-shaped seam ridge guide adapted to receive the seam ridge as the seam is fed to the work support, said seam ridge guide maintaining the seam ridge in correct position until it is acted on by the seam presser. If it happens that the two edges of the leather which are seamed together are of different thicknesses or one is slightly stiffer than the other then the tendency would be for the thinner and more flexible edge to double under as the pressing operation took place so that the seam ridge would, in being pressed, be crowded to one side of its correct position. With my improvements this tendency is prevented because the seam ridge guide holds the seam ridge accurately in position until it is acted on by the presser.

As applied to the pressing of a seam formed when two pieces of fabric are sewed together my invention comprehends the yieldable seam crease supporting member operating as above described and also a seam ridge guide in the form of a flap opener which spreads the two edges or flaps of the seam ridge and folds them back upon the fabric prior to the operation of the seam presser.

If a tape is to be applied to the seam as in my Patent No. 1,646,212 a tape-delivering means is employed which is so situated that it will deliver the tape to the work after it is acted upon by the seam crease support and seam ridge guide and prior to its being acted upon by the seam presser.

In order to give an understanding of the invention I have illustrated in the drawings some selected embodiments thereof which will now be described after which the novel features will be pointed out in the appended claims.

Fig. 1 is a side view showing a portion of a seam-pressing machine having my improvements applied thereto, said figure illustrating the construction which may be employed in pressing a seam formed by uniting two pieces of leather;

Fig. 2 is an under side view of the seam ridge guide;

Fig. 3 is a view of the seam crease support and seam ridge guide looking toward the left in Fig. 1;

Fig. 4 is a fragmentary perspective view illustrating two pieces of leather sewed together;

Fig. 5 is a fragmentary view showing the action of the seam crease support in supporting the seam;

Fig. 6 shows the manner in which the seam crease support and seam ridge guide co-operate in supporting and guiding the work as it is fed to the seam ridge presser;

Fig. 7 is a section on substantially the line 7—7, Fig. 1;

Fig. 8 is a section on the line 8—8, Fig. 1;

Fig. 9 is a fragmentary perspective view of the active face of the seam ridge pressing member;

Fig. 10 illustrates the seam ridge after it is pressed, said figure showing a tape also adhesively applied to the seam ridge;

Fig. 11 is a view similar to Fig. 1 but showing the device adapted for operating on a seam ridge formed when two pieces of fabric are united;

Fig. 12 is an under side view of the seam crease guide and opener;

Fig. 13 is a view of the seam crease support and seam guide looking toward the left in Fig. 11;

Fig. 14 is a perspective view showing two pieces of fabric united together and illustrating the amount of seam allowance necessary;

Fig. 15 is a section on the line 15—15, Fig. 11;

Fig. 16 is a section on the line 16—16, Fig. 11;

Fig. 17 is a section on the line 17—17, Fig. 11;

Fig. 18 is a section on the line 18—18, Fig. 11;

Fig. 19 illustrates the seam in two pieces of fabric after it has been pressed and taped.

Inasmuch as my present invention relates simply to the means for supporting and guiding the seam prior to its being operated upon by the presser I have not thought it necessary to illustrate herein the complete seam-pressing machine, the main features of which are or may be similar to those illustrated in my above-mentioned Patent No. 1,646,212, to which reference may be had.

The machine illustrated in said patent comprises a work support over which the work is fed and an oscillatory seam-pressing and work-feeding member co-operating with the work support to press the seam ridge progressively and at the same time feed the work forward.

Referring to Fig. 1 the work support is indicated at 1, it being in the form of a roll which is mounted for free rotation in a suitable stand or support 2. The seam-ridge pressing and work-feeding member is indicated at 3, it having a combined oscillating and rocking motion and being adapted to act on the seam ridge progressively as the work is fed over the work support 1 thereby to progressively press the seam ridge.

As stated above, one feature of the present invention relates to a yieldable or resilient seam crease supporting member adapted to support and assist in guiding the seam to the seam-pressing member. This seam crease supporting member in Fig. 1 is indicated at 4 and it is in the form of a curved resilient finger which is secured to the stand 2 and is situated so as to engage the under side of the seam crease as the work is fed to the work support 1. In Fig. 4, for instance, is illustrated two pieces of leather 5 and 6 which are seamed together along one edge as indicated by the stitches or seam 7. In the case of leather it is possible to place the stitches 7 relatively close to the edges 8 of the pieces 5 and 6 and when the two pieces 5 and 6 are opened away from each other there will be formed the seam ridge indicated generally at 9 and which is constituted by the portions of the two pieces of leather between the stitches 7 and the edges 8, this being the seam ridge which is pressed or flattened by the operation of the seam-pressing member 3, all as described in my above-mentioned patent.

In the present invention the work comprising the two pieces 5 and 6 sewed together by the stitches 7 is introduced into the machine above the seam crease support 4 so that said seam crease support will engage the under side of the seam 7 as best seen in Fig. 5. Said finger thus supports the seam and assists in guiding it properly to the seam-pressing member 3.

Co-operating with the seam crease support 4 is a seam ridge guide indicated generally at 10. The particular shape and construction of the seam ridge guide may vary somewhat depending on the character of the material which is to be operated upon. In the case of a leather seam such as shown in Fig. 4 I prefer to use a seam ridge guide of the construction illustrated in Figs. 1, 2 and 3. This seam ridge guide comprises two guiding members 11 and 12 which form between them a guiding channel to receive the seam ridge 9. This seam ridge guide is situated above the seam crease supporting finger 4 and the members 11 and 12 are shaped to present between them a converging passage. The rear portions 13 of the members 11 and 12 are flared outwardly as seen in Figs. 2 and 3, the flaring portions 13 gradually approaching each other from the rear toward the front of the seam crease support and at the front end extending substantially parallel as shown at 14. These two members 11 and 12 are shown as carried by a holder 15 which in turn is removably supported by a bracket arm 16 forming part of the machine.

The holder 15 is shown as having a forked end 17 that is adapted to be received in a groove or way 18 formed in the bracket arm 16, said holder 15 being clamped in adjusted position by means of a clamping screw 19 which extends through the forked arm 17 and screws into the supporting bracket 16. This provides for readily detaching the seam ridge guide and also for adjusting it laterally.

In the operation of the device two pieces of leather 5 and 6 which are sewed together as shown in Fig. 4, are opened away from each other slightly and placed on the seam crease supporting member 4 with the latter engaging the seam crease as shown in Fig. 5. The two pieces are then moved forward on the seam support 4 during which movement the seam ridge 9 will enter between the spread ends 13 of the members 11 and 12 of the seam ridge guide and as the seam ridge moves along its guide toward the presser it will be carried and accurately guided into the narrow space 20 between the parallel portions 14 of the seam guide as shown in Fig. 6. These portions 14 of the seam ridge guide will, therefore, accurately guide the seam ridge in its movement toward the seam presser 3. The end 14 of the seam-guiding members 11, 12 is situated closely adjacent to the seam presser 3 and said seam ridge guide, therefore, accurately guides the seam ridge and maintains it in proper position to be acted upon by the seam presser.

The two sides 11 and 12 of the seam ridge guide are adjustable relative to each other so as to provide for operating on leather of different thicknesses. These members are made of sheet metal and each is provided with a foot portion 21 whcih is secured to the carrier 15 by means of screws 22. Said members are also somewhat resilient and are held in adjusted position relative to each other by an adjusting screw 23 which extends through one member and is screw-threaded into the other. The screw is retained in its adjusted position by means of a spring arm 24 which engages one of the flat sides of the head 25 of the screw 23, said head being herein illustrated as provided with a screw driver slot by which the screw may be manipulated.

The member 11 has rigid therewith a gauge pin 26 which extends through an aperture in the member 12. This pin is located near the delivery end of the seam ridge guide and forms a bearing against which the free end edge faces 8 of the seam ridge rest as it is guided. The seam crease supporting arm 4 is slightly resilient and its action on the work is to force the seam ridge upwardly into the passage 20 and maintain it in engagement with the gauge pin 26 as the work is fed forward.

In actual practice I propose to adjust the side members 11, 12 of the seam ridge guide so that they will snugly fit the sides of the seam ridge. In fact, it is preferable to so adjust them that when the seam ridge enters the throat the members 10 and 11 will be crowded apart slightly, the resiliency of said members permitting this. The seam is thus accurately and firmly guided as it is fed to the seam presser.

The will be noted that the adjusting screw 23 is at the rear end of the members and because of their resiliency the forward ends which bound the throat 20 are permitted to give as necessary to accommodate any variation in thickness of the seam ridge.

The co-operative action of the seam ridge guide and seam crease support is best seen in Fig. 6 from which it will be observed that as the seam leaves the seam ridge guide and seam crease support the two pieces of leather 5 and 6 will be bent sharply around the lower edges of the members 11, 12 so that the lower face of the seam members will present a flat appearance.

Some machines of this type are provided with means for delivering adhesive tape to the work so that said tape will overlie the seam ridge as the latter passes underneath the seam-pressing member 3. In Fig. 1, 27 indicates the adhesive tape and this is guided to the work through the medium of a tape-guiding member 28 which may be constructed and operate similar to the tape-guiding member in my above-mentioned patent. The seam crease support 4 and the seam ridge guide 10 are so situated that they act on the work before the tape 27 is applied thereto, said tape being laid on the work as it is delivered from the seam ridge guiding member 10 and before it is acted on by the seam presser 3. In other words, the tape-applying means is located between the seam ridge guiding means and the pressing means therefor.

The seam-pressing member is constructed so that its active face 29 (Fig. 9) operates on the seam progressively in a transverse direction all as described in my above-mentioned patent. As the seam ridge with the tape thereon passes beneath the seam-pressing member 3 the latter first acts on the seam ridge and presses the tape thereagainst and subsequently acts on the edges of the tape outside of the flattened seam ridge. In other words, the entering end of the active face 29 is constructed to apply pressure to the seam ridge only, as shown in Fig. 7, and the delivery or rear end is constructed to apply pressure to the edges of the tape only and not to the seam ridge as shown in Fig. 8.

This is provided for by forming the active face 29 of the pressing member with a groove 30 in the rear or delivery end of the face, said groove having a progressively increasing depth and at its point of greatest depth being deeper than the height of the compressed seam ridge.

By having the delivery end of the seam ridge guide located closely adjacent to the entering end of the seam-pressing member 3 the seam ridge will be held from slumping sidewise when the seam is pressed in case one of the edges 8 should be thinner and of less stiff material than the other edge.

In Figs. 11 to 19 I have shown my invention as adapted for pressing seams formed in fabrics. In the case of two pieces of fabric 31, 32 that are sewed together face to face it is necessary to place the seam 7 at a relatively greater distance from the edges 33 than in the case of leather. In pressing a fabric seam of this nature it is desirable first to open the edges 33 away from each other and then to press them flat against the body of the fabric. It is also customary to apply a coating of adhesive to the marginal zone of the outer faces of the fabric pieces 31, 32 as indicated by the shaded portion 34 so that when the two edges 33 are opened away from each other and folded back against the body of the fabric they will adhere thereto.

As applied to the pressing of a fabric seam my invention comprises the seam crease support which supports the under side of the seam and a seam ridge guide in the form of a seam opener which operates first to open the edges 33 and fold them partially back onto the body of the fabric so that when they pass to the seam-pressing member 3 the edges will be in position to be pressed flat against the fabric as shown in Fig. 19.

The seam crease support illustrated in Fig. 11 is indicated at 34 and it is in the form of a finger that is detachably secured to the stand or support 2 and has the upright portion 35 which terminates in the relatively straight supporting portion 36 that has a slight angular relation. The seam ridge guide and opener is indicated generally at 37 and it is secured to a carrier 88 similar to the carrier 15 that is adapted to be detachably supported by the bracket 16 and clamped thereto by means of the clamping screw 19. The seam ridge opener 37 is formed with a relatively sharp nose 38 at the entering end and from the entering end nearly to the rear end the body of the member is V-shaped in cross-section and at the rear end the lower edge of the body is flattened or widened as shown at 39, the nose 38 being connected to the widened portion by the ridge portion 40.

The seam ridge opener and guide are located directly above the seam crease supporting portion 36 and the cloth is fed into the machine between the seam crease supporting member 36 and the seam ridge opener 37. As the cloth is fed forward the nose 38 enters between the edges 33 of the seam and separates said edges as shown in Fig. 15, the seam being supported on the seam crease support 36 and being held in position against the seam ridge opener thereby. As the work is moved forward the ridge 40 tends to spread the edges 33 as shown in Fig. 16 and as the spread edges 33 pass under the folding face 39 they are folded over onto the body of the fabric as shown in Fig. 16. Just as the opened seam leaves the folding face 39 it passes under the seam presser 3 and the action of the latter co-operating with the work support 1 will press the folded edges 33 firmly against the body of the fabric as shown in Fig. 17. In case the fabric has been provided with the adhesive indicated at 34 the action of the seam presser will be to cause the folded edges 33 to adhere to the body of the fabric. In applying the adhesive coating 34 to both sides of the united fabric there will be a tendency for the adhesive to cause the edges 33 to adhere together. As the fabric is fed forward and the nose 38 enters between the edges 33 the latter will tend to adhere at their margins so that the edges 33 will first be separated between the seam 7 and the margin and as the work progresses the adhesively-united margin will be broken apart and the two edges 33 will be folded over as they travel underneath the seam opener as above described.

Co-operating with the seam ridge guide and opener are two blades 70 and 71 between which the seam passes as it is being opened as illustrated in Fig. 16. These two blades are the horizontal portions of two L-shaped sheet metal members 72, 73 which are secured to the holder 88 and they assist in the folding of the edges 33 over onto the body of the work.

If this machine is equipped with the tape-guiding means 28 the latter will be situated so that the tape 27 will be applied to the work just as it leaves the folding face 39 of the seam opener and just before it is fed to the seam presser, the result being that the tape 27 will be adhesively applied to the folded and pressed edges 33 as indicated in Figs. 17 to 19 inclusive.

The seam crease supports are detachably secured to the stand 2 and the seam ridge guides are detachably secured to the carriers 15 and 88 so that seam crease supports of different shapes and seam ridge guides of different construction may be interchangeably used according to the character of the material operated on. Each of the seam crease supports is provided with a forked lower end 43 which is received in a suitable groove 44 formed in the stand 2, each support being clamped in position by a clamping screw 45 which screws into the support 2 and enters between the arms of the fork 43.

To gauge the position of the seam crease support and seam ridge guide when it is put on and to avoid the necessity of making a separate adjustment each time that a change is made I propose to provide each interchangeable member with a positioning lip 46 that is adapted to engage a flange 47 on the clamping screw 45. A positioning lip of this sort may be used on each of the attachments and it is shown as formed on the end of a slotted plate 48 that is adjustably secured to the attachment by a set screw 49. This lip can be thus properly positioned and then locked in place by the set screw 49 and when it is thus positioned it will form a gauge for properly adjusting the attachment. All that is necessary is to loosen the clamping screw 45 in the case of the seam crease support or the clamping screw 19 in the case of the seam ridge guide and then insert the fork of the attachment behind the flange 47 of the screw and straddling the body of the screw and then tightening the clamping screw when the gauging lip 46 is in engagement with the flange 47. By having the gauging lips 46 properly positioned on each attachment the correct position of the attachment is always assured whenever it is replaced.

The work support 1 which is in the form of a roll is shown as provided with a central ring 66 of metal which forms an anvil against which the seam ridge is pressed as shown in Fig. 7. Either side of this central metal ring 66 is a rubber ring 67 which supports the work either side of the seam ridge and which forms a yielding anvil to receive the pressure when the edges of the tape 27 are being pressed as shown in Fig. 8. For hammering down the seam ridge it is desirable that the work should be unyieldingly supported while for pressing the marginal portions of the tape against the work a yielding support for the work is more desirable. The construction herein shown provides both of these desirable features, the unyielding central ring 66 supporting the seam as it is pounded down or pressed and the yielding rings 67 supporting the work either side of the seam as the marginal portions of the tape are being pressed against the work.

I claim:

1. In a seam-pressing machine, the combination with a work support over which is fed work in the form of two pieces sewed together by a seam presenting a seam ridge and a seam-pressing member co-operating with the work support to press the seam, of a seam guide comprising two guiding members between which the seam ridge is fed, a gauge member extending across the space between said guiding members and against which the seam ridge bears, and a resilient seam crease-supporting finger over which the seam is fed and which yieldingly holds the seam ridge against the gauge member.

2. In a seam-pressing machine, the combination with a work support over which is fed work in the form of two pieces sewed together by a seam presenting a seam ridge and a seam-pressing member co-operating with the work support to press the seam, of a seam guide comprising two resilient guiding members between which the seam ridge passes, a gauge member to engage the upper end of the seam ridge, and a resilient seam crease-supporting finger for yieldingly holding the seam in the seam guide and against the gauge.

3. In a seam-pressing machine, the combination with a work support over which is fed work in the form of two pieces sewed together by a seam presenting a seam ridge and a seam-pressing member co-operating with the work support to press the seam, of a seam guide comprising two guiding members adjustable toward and from each other and between which the seam ridge passes, a gauge member carried by said guiding members adjacent the delivery end thereof and against which the seam ridge bears, and a resilient seam crease-supporting member operating to hold the seam ridge yieldingly against the gauge member.

4. In a seam-pressing machine, the combination with a work support over which is fed work in the form of two pieces sewed together by a seam presenting a seam ridge and a seam-pressing member co-operating with the work support to press the seam, of a seam guide presenting two resilient guiding members between which the seam ridge passes, a carrier to which said guiding members are connected at the entering end of the guide, said guiding members extending rearwardly from the carrier and having a converging relation from the entering end, an adjusting screw connecting said members by which they may be adjusted toward and from each other, and a seam-supporting member for supporting the seam and holding the seam rigid between the guides.

5. In a seam-pressing machine, the combination with a work support over which is fed work in the form of two pieces sewed together by a seam presenting a seam ridge and a seam-pressing member co-operating with the work support to press the seam, of a seam guide presenting two resilient guiding members between which the seam ridge passes, a carrier to which said guides are connected at the entering end of the guide, an adjusting screw connecting said members by which they may be adjusted toward and from each other, a gauge pin member extending transversely across the space between said guiding members at the delivery end of the seam guide, and a resilient seam-supporting finger for yieldingly holding the seam ridge against said gauge member as the work is fed.

6. In a seam-pressing machine, the combination with a work support over which is fed work in the form of two pieces sewed together by a seam presenting a seam ridge, and a seam-pressing member co-operating with the work support to press the seam, of seam-guiding means presenting a seam-guiding passage constituted by two resilient side members to engage the sides of the seam ridge, an upper and a lower member to engage the free end faces of the pieces adjacent the seam ridge and the seam crease, respectively, one of the latter members being resilient, whereby the bounding sides of the guiding passage are relatively yieldable both laterally and vertically.

7. In a seam-pressing machine, the combination with a work support over which is fed work in the form of two pieces sewed together by a seam presenting a seam ridge and a seam-pressing member co-operating with the work support to press the seam, of seam-guiding means provided with a seam-guiding passage constituted by two resilient side members adapted to engage sides of the seam ridge, an upper and a lower member to engage the free end faces of the pieces adjacent the seam ridge and the seam crease, respectively, the lower member being resilient, whereby the sides which bound the seam-guiding passage are relatively yieldable both laterally and vertically.

8. In a seam pressing machine, the combination with a work support over which is fed work in the form of two pieces sewed together by a seam presenting a seam ridge on one face of the work and a seam crease on the other face of the work, and a seam-pressing member cooperating with the work support to press the seam, of two relatively movable members for engaging the free end edge faces of the pieces adjacent the seam ridge and the seam crease, respectively.

In testimony whereof, I have signed my name to this specification.

WALTER P. OSGOOD

CERTIFICATE OF CORRECTION.

Patent No. 1,850,120.

March 22, 1932.

WALTER P. OSGOOD.

It is hereby certified that error appears in the printed specification of the above numbered patent requiring correction as follows: Page 3, line 80, for "The" first occurrence read It; page 5, line 126, claim 5, strike out the word "pin"; and that the said Letters Patent should be read with these corrections therein that the same may conform to the record of the case in the Patent Office.

Signed and sealed this 12th day of July, A. D. 1932.

(Seal)

M. J. Moore,
Acting Commissioner of Patents.

ridge against said gauge member as the work is fed.

6. In a seam-pressing machine, the combination with a work support over which is fed work in the form of two pieces sewed together by a seam presenting a seam ridge, and a seam-pressing member co-operating with the work support to press the seam, of seam-guiding means presenting a seam-guiding passage constituted by two resilient side members to engage the sides of the seam ridge, an upper and a lower member to engage the free end faces of the pieces adjacent the seam ridge and the seam crease, respectively, one of the latter members being resilient, whereby the bounding sides of the guiding passage are relatively yieldable both laterally and vertically.

7. In a seam-pressing machine, the combination with a work support over which is fed work in the form of two pieces sewed together by a seam presenting a seam ridge and a seam-pressing member co-operating with the work support to press the seam, of seam-guiding means provided with a seam-guiding passage constituted by two resilient side members adapted to engage sides of the seam ridge, an upper and a lower member to engage the free end faces of the pieces adjacent the seam ridge and the seam crease, respectively, the lower member being resilient, whereby the sides which bound the seam-guiding passage are relatively yieldable both laterally and vertically.

8. In a seam pressing machine, the combination with a work support over which is fed work in the form of two pieces sewed together by a seam presenting a seam ridge on one face of the work and a seam crease on the other face of the work, and a seam-pressing member cooperating with the work support to press the seam, of two relatively movable members for engaging the free end edge faces of the pieces adjacent the seam ridge and the seam crease, respectively.

In testimony whereof, I have signed my name to this specification.

WALTER P. OSGOOD

CERTIFICATE OF CORRECTION.

Patent No. 1,850,120.　　　　　　　　　　　　　　　　　　　　March 22, 1932.

WALTER P. OSGOOD.

It is hereby certified that error appears in the printed specification of the above numbered patent requiring correction as follows: Page 3, line 80, for "The" first occurrence read It; page 5, line 126, claim 5, strike out the word "pin"; and that the said Letters Patent should be read with these corrections therein that the same may conform to the record of the case in the Patent Office.

Signed and sealed this 12th day of July, A. D. 1932.

(Seal)

M. J. Moore,
Acting Commissioner of Patents.

CERTIFICATE OF CORRECTION.

Patent No. 1,850,120.                                                                March 22, 1932.

WALTER P. OSGOOD.

It is hereby certified that error appears in the printed specification of the above numbered patent requiring correction as follows: Page 3, line 80, for "The" first occurrence read It; page 5, line 126, claim 5, strike out the word "pin"; and that the said Letters Patent should be read with these corrections therein that the same may conform to the record of the case in the Patent Office.

Signed and sealed this 12th day of July, A. D. 1932.

(Seal)                                                                   M. J. Moore,
Acting Commissioner of Patents.